(12) United States Patent
Kim (10) Patent No.: US 12,452,344 B2
(45) Date of Patent: Oct. 21, 2025

(54) METHOD FOR PROVIDING EDGE COMPUTING SERVICE AND APPARATUS FOR EDGE COMPUTING SERVICE

(71) Applicant: FOUNDATION OF SOONGSIL UNIVERSITY-INDUSTRY COOPERATION, Seoul (KR)

(72) Inventor: Young Han Kim, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 137 days.

(21) Appl. No.: 18/514,130

(22) Filed: Nov. 20, 2023

(65) Prior Publication Data
US 2024/0179223 A1    May 30, 2024

(30) Foreign Application Priority Data
Nov. 28, 2022   (KR) .................. 10-2022-0161656

(51) Int. Cl.
*H04L 61/2517* (2022.01)
*H04L 61/4511* (2022.01)
(Continued)

(52) U.S. Cl.
CPC .......... *H04L 67/63* (2022.05); *H04L 67/1012* (2013.01); *H04W 12/06* (2013.01)

(58) Field of Classification Search
CPC ..... H04W 48/18; H04W 24/08; H04W 40/02; H04W 28/18; H04L 41/0806; H04L 43/04; H04L 45/306; H04L 41/0894
See application file for complete search history.

(56) References Cited

U.S. PATENT DOCUMENTS

| 12,279,230 B2 * | 4/2025 | Lin ................... H04W 52/0216 |
| 2018/0007604 A1 * | 1/2018 | Pillay-Esnault ...... H04W 36/26 |

(Continued)

FOREIGN PATENT DOCUMENTS

| KR | 10-2178348 B1 | 11/2020 |
| KR | 10-2022-0122339 A | 9/2022 |

*Primary Examiner* — Nicholas R Taylor
*Assistant Examiner* — Ho T Shiu
(74) *Attorney, Agent, or Firm* — Stein IP, LLC (57) ABSTRACT

An edge computing service-providing method and an apparatus for the same are disclosed. An infrastructure information apparatus for an edge computing service located in a control plane of a mobile communication network comprises an API server that receives a user plane function (UPF) selection request message from a session management function (SMF) of the mobile communication network when there is an edge computing service request from a user equipment (UE), a local database that stores at least one of a plurality of service names, a plurality of service identifiers corresponding to the plurality of service names, a plurality of MEC (multi-access edge computing) server identifiers, resource status information for each of the plurality of MEC servers, a UPF identifier for connection to each of the plurality of MEC servers, and a user terminal identifier connected to each of the plurality of MEC servers, and an analyzer that selects an optimal MEC server for providing the requested edge computing service through information stored in the local database or through query and response with an information system in a cloud computing infrastructure or Internet infrastructure, wherein the API server transmits a response message including a UPF identifier for connection to the selected optimal MEC server to the SMF.

13 Claims, 10 Drawing Sheets

(51) Int. Cl.
*H04L 67/1012* (2022.01)
*H04L 67/63* (2022.01)
*H04W 12/06* (2021.01)
*H04W 24/08* (2009.01)
*H04W 28/02* (2009.01)
*H04W 48/18* (2009.01)

(56) References Cited

U.S. PATENT DOCUMENTS

2021/0153095 A1* 5/2021 Yang .................. H04L 43/04
2022/0086218 A1* 3/2022 Sabella ................ H04M 15/66
2022/0103427 A1* 3/2022 Mallipudi ................ G06F 8/65
2022/0248296 A1* 8/2022 Merwaday ............ H04W 48/18
2023/0308951 A1* 9/2023 Zhang ................ H04W 28/084

* cited by examiner

| S-NAME | SID | MEC list | | UPF ID | Serving UEs | utilization |
|---|---|---|---|---|---|---|
| Service A | SID#1 | MECx | Computing instance a, IP addr | UPFa | UEk... | X% |
| | | MECy | Computing instance b, IP addr | UPFa | | Y% |
| | | ... | Computing instance c, IP addr | UPFa | | |
| | | MECz | ... | ... | ... | |
| Service B | SID#2 | | ... | | | |
| Service C | SID#3 | | ... | | | |
| Service D | SID#4 | | ... | | | |

METHOD FOR PROVIDING EDGE COMPUTING SERVICE AND APPARATUS FOR EDGE COMPUTING SERVICE

CROSS-REFERENCE TO RELATED APPLICATIONS

This application claims the benefit of Korean Application No. 10-2022-0161656, filed Nov. 28, 2022, in the Korean Intellectual Property Office. All disclosures of the document named above are incorporated herein by reference.

TECHNICAL FIELD

The present invention relates to a method for providing edge computing services and an apparatus for the same.

BACKGROUND ART

Currently, computing services through mobile communication networks are evolving from a method of providing services by accessing a central cloud infrastructure to a method of providing services through an edge computing environment close to the user's location.

As a way to access the edge computing environment from a mobile communication network, various access methods such as WiFi and wired access are provided in addition to 4G/5G access, and this is defined as MEC (Multi-access edge computing) to provide various edge computing services.

Figure 1:
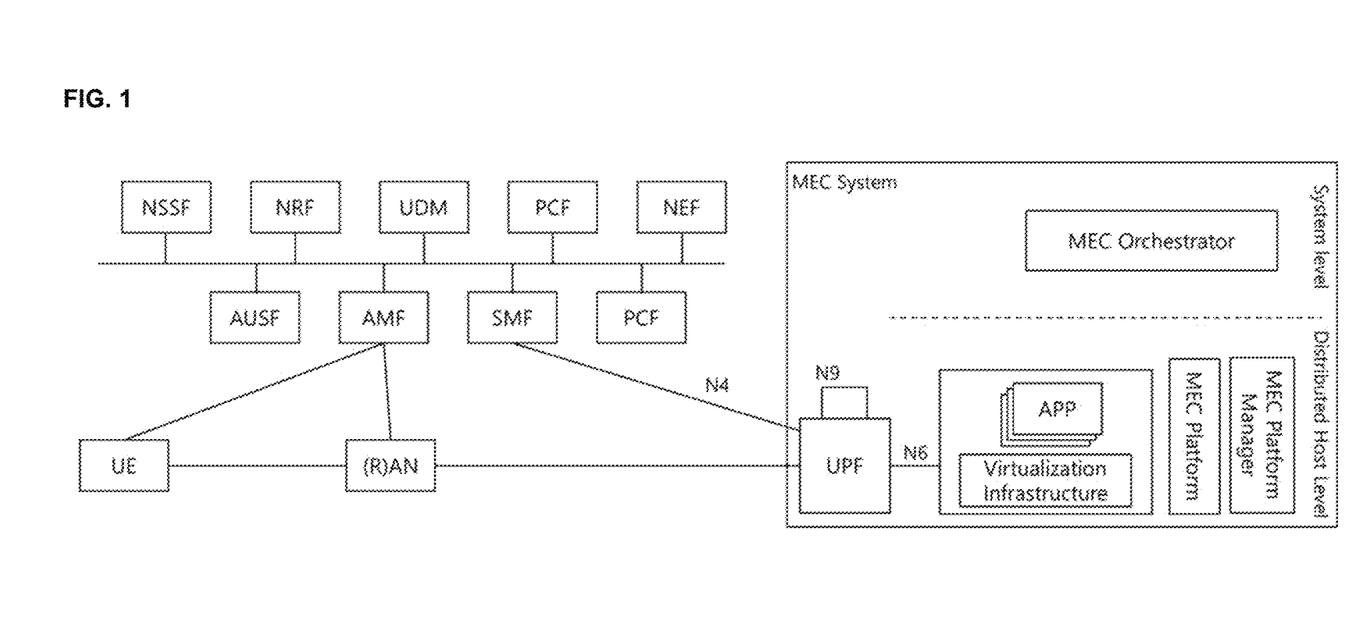
FIG. 1 is a diagram showing the access structure through the MEC system in a 5G mobile communication network.

FIG. 1 is a diagram showing the access structure through the MEC system in a 5G mobile communication network.

Referring to FIG. 1, a user equipment (UE) accesses the MEC server through the UPF (User Plane Function) and N6 interface of the 5G mobile communication network.

Application services provided to the user terminal are provided through a virtual machine (VM), which is the virtualization infrastructure within the MEC system, or an application (APP) within the container computing environment.

The above environment includes several infrastructure services such as 5G communication services, MEC and cloud computing services, and Internet networking services. Each infrastructure service may be provided by a single service management entity, and a model that separates each service management area may be applied for system management and service diversity.

Meanwhile, computing services may include services prepared in advance by mobile communication service providers such as video analysis services, AR (Augmented Reality) services, and V2I (Vehicle to Infrastructure) services, as well as general computing services (Infrastructure as a service) that simply provide computing resources according to user needs.

In general, PDU (Packet Data Unit) session connection for computing services in mobile communication networks is performed by connecting the PDU session to a general data network, that is, the Internet, through a central UPF, and then querying the DNS (Domain Name System) to obtain an IP address corresponding to the service name and connecting an IP session.

Figure 2:
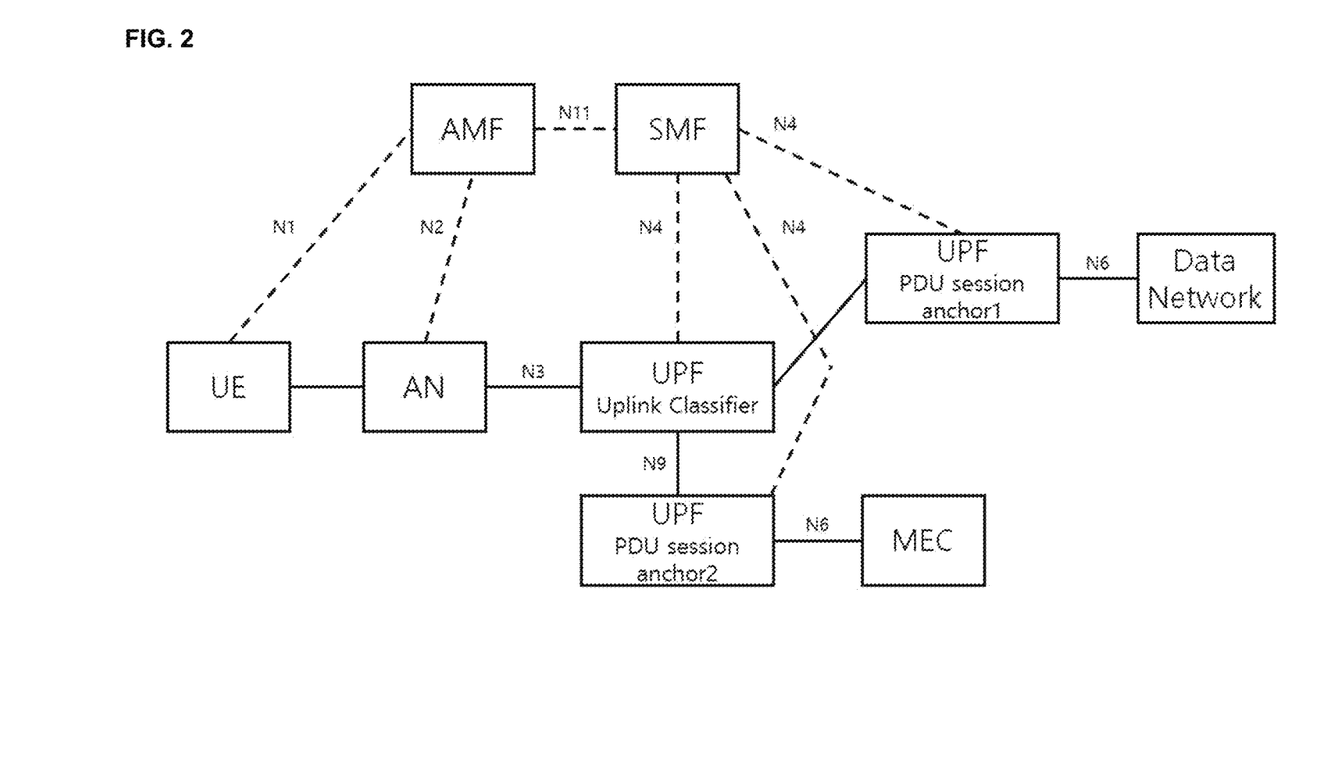
FIGS. 2 and 3 are diagrams for explaining the conventional MEC server selection process.
Figure 3:
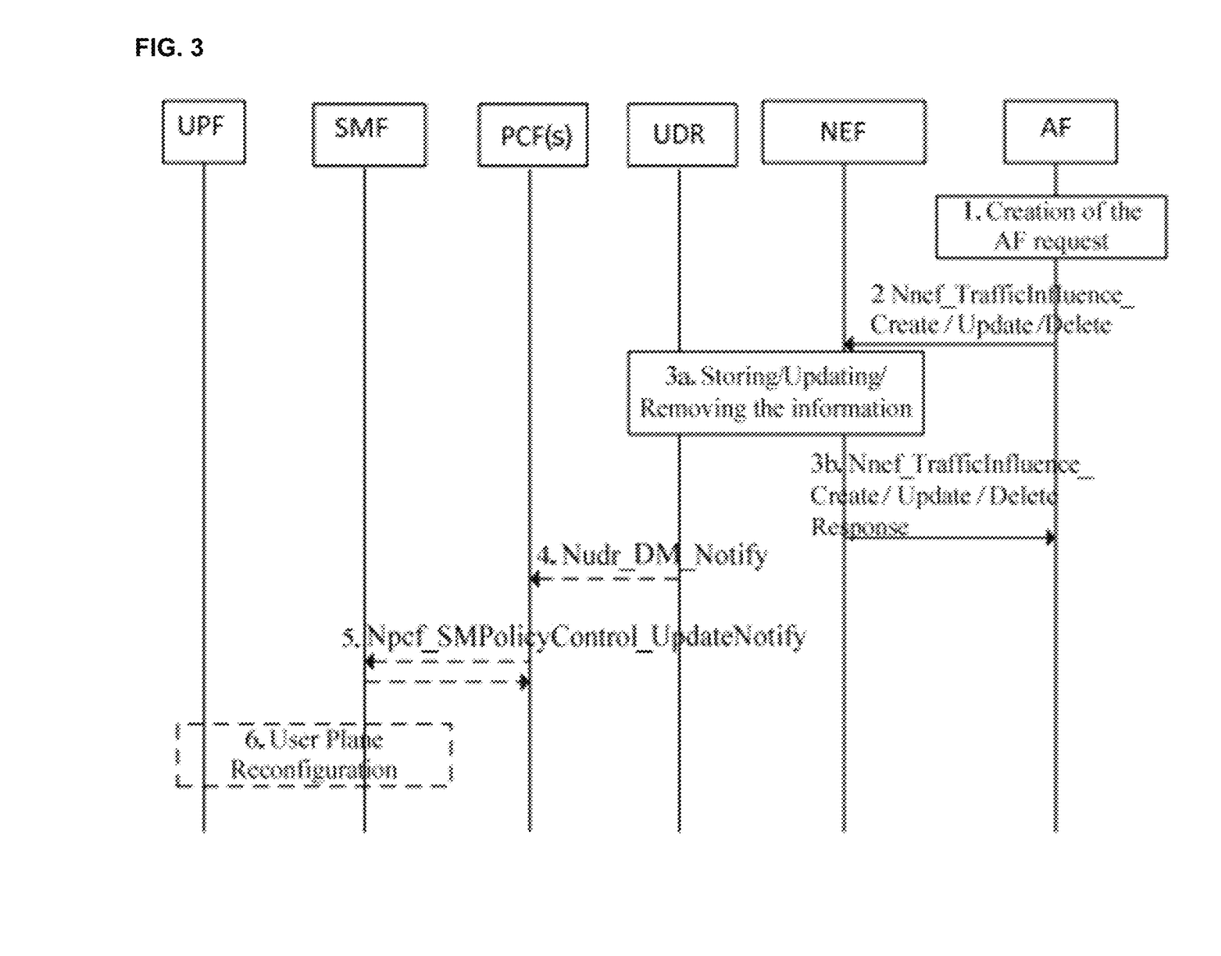

FIGS. 2 and 3 are diagrams for explaining the conventional MEC server selection process.

Referring to FIGS. 2 and 3, MEC servers are distributed and located in various places in the mobile communication network, and the connection to the MEC server that will provide computing services to users in the mobile communication network is made primarily after forming a PDU session to the central UPF.

After a PDU session is established with the central UPF, the initially connected PDU session is switched to the UPF connected to the MEC server through a request from the AF (Application Function) within the 5G mobile communication network.

However, this method cannot reflect real-time computing situations and has the problem of causing a delay until connection to the optimal MEC because the procedure for changing the session should be performed again after connecting the primary PDU session.

Additionally, when MEC servers that can accommodate the computing service requested by the user are located in multiple locations, the final MEC server selection is generally determined only by the MEC server closest to the access location of the user terminal. Accordingly, even when the number of users receiving services from the relevant MEC server increases and the server becomes congested, there is a problem in that the service cannot be provided through other available MEC servers nearby.

DISCLOSURE

Technical Problem

In order to solve the problems of the prior art described above, the present invention is to provide a method for providing an edge computing service that can provide computing services by comprehensively considering the location of each MEC server, the service status provided by each MEC server, and resource status information within each MEC server, and an apparatus for the same.

Technical Solution

In order to achieve the above object, according to an embodiment of the present invention, an infrastructure information apparatus for an edge computing service located in a control plane of a mobile communication network comprises an API server that receives a user plane function (UPF) selection request message from a session management function (SMF) of the mobile communication network when there is an edge computing service request from a user equipment (UE); a local database that stores at least one of a plurality of service names, a plurality of service identifiers corresponding to the plurality of service names, a plurality of MEC (multi-access edge computing) server identifiers, resource status information for each of a plurality of MEC servers, a UPF identifier for connection to each of the plurality of MEC servers, and a user terminal identifier connected to each of the plurality of MEC servers; and an analyzer that selects an optimal MEC server for providing the requested edge computing service through information stored in the local database or through query and response with an information system in a cloud computing infrastructure or Internet infrastructure, wherein the API server transmits a response message including a UPF identifier for connection to the selected optimal MEC server to the SMF.

The edge computing service request may include the user terminal identifier and a service identifier for the edge computing service.

The service identifier may be assigned differently depending on the type of service pre-registered by a mobile communication service provider and the type of computing the resource providing service.

The pre-registered service may include at least one of a video analysis service, an augmented reality service, a V2I (Vehicle to Infrastructure) service, an autonomous driving service, and a smart factory service.

The local database may store an identifier for one or more available MEC servers that can accommodate the requested edge computing service among all MEC servers and resource status information of one or more MEC servers.

The local database may store one or more computing instance identifiers provided by each of the plurality of MEC servers and an IP address of each computing instance.

The response message may include a computing instance IP address selected to provide the requested edge computing service and a UPF identifier for accessing the IP address.

The response message may further include authentication information for the user terminal to access the selected computing instance.

The resource status information may be defined as a utilization rate considering the usage of a CPU/GPU, main memory, and storage of each of one or more computing instances provided by each of the plurality of MEC servers.

When the location of a first user terminal moves by referring to information stored in the local database, the analyzer may reselect an optimal MEC server for the first user terminal considering the moved location of the first user terminal.

The apparatus may further comprise a plurality of interfaces responsible for assess to a computing information server, ALTO (Application Layer Traffic Optimization) server, and LISP (Location ID Separation Protocol) mapping server included in the information system.

The information stored in the local database may be periodically updated.

When a service corresponding to the requested edge computing service does not exist in the local database, the apparatus may query the information system with the name of the requested edge computing service as a variable to receive one or more MEC server identifiers capable of providing the requested edge computing service, a computing instance identifier within each MEC server, an IP address and authentication information for accessing each computing instance, and resource status information of the one or more MEC servers and each computing instance.

According to another aspect of the present invention, an infrastructure information apparatus for an edge computing service located in a control plane of a mobile communication network comprises a processor; and a memory connected to the processor, wherein the memory comprises program instructions executable by the processor comprises receiving a user plane function (UPF) selection request message from a session management function (SMF) of the mobile communication network when there is an edge computing service request from a user equipment (UE), storing at least one of a plurality of service names, a plurality of service identifiers corresponding to the plurality of service names, a plurality of MEC (multi-access edge computing) server identifiers, resource status information for each of the plurality of MEC servers, a UPF identifier for connection to each of the plurality of MEC servers, and a user terminal identifier connected to each of the plurality of MEC servers, selecting an optimal MEC server for providing the requested edge computing service through information stored in the local database or through query and response with an information system in a cloud computing infrastructure or Internet infrastructure, transmitting a response message including a UPF identifier for connection to the selected optimal MEC server to the SMF.

According to another aspect of the present invention, a method for providing an edge computing service from an apparatus located in a control plane of a mobile communication network comprises receiving a user plane function (UPF) selection request message from a session management function (SMF) of the mobile communication network when there is an edge computing service request from a user equipment (UE), storing at least one of a plurality of service names, a plurality of service identifiers corresponding to the plurality of service names, a plurality of MEC (multi-access edge computing) server identifiers, resource status information for each of the plurality of MEC servers, a UPF identifier for connection to each of the plurality of MEC servers, and a user terminal identifier connected to each of the plurality of MEC servers, selecting an optimal MEC server for providing the requested edge computing service through information stored in the local database or through query and response with an information system in a cloud computing infrastructure or Internet infrastructure, and transmitting a response message including a UPF identifier for connection to the selected optimal MEC server to the SMF.

Advantageous Effects

According to the present invention, there is an advantage that edge computing service requests requested by a user terminal can be efficiently processed by interworking with an information system on a cloud computing infrastructure or Internet infrastructure through an infrastructure information apparatus.

In addition, according to the present invention, there is an advantage of being able to mediate the connection between the user terminal and the optimal MEC server through IIF without changing the UPF.

BRIEF DESCRIPTION OF DRAWINGS

These and/or other aspects will become apparent and more readily appreciated from the following description of the embodiments, taken in conjunction with the accompanying drawings in which.

DETAILED DESCRIPTION OF EMBODIMENTS

Since the present invention can make various changes and have various embodiments, specific embodiments will be illustrated in the drawings and described in detail in the detailed description. However, this is not intended to limit the present invention to specific embodiments, and should be understood to include all changes, equivalents, and substitutes included in the spirit and technical scope of the present invention.

The terms used herein are only used to describe specific embodiments and are not intended to limit the invention. Singular expressions include plural expressions unless the context clearly dictates otherwise. In this specification, terms such as "comprise" or "have" are intended to indicate the presence of features, numbers, steps, operations, components, parts, or combinations thereof described in the specification, but are not intended to exclude in advance the possibility of the existence or addition of one or more other features, numbers, steps, operations, components, parts, or combinations thereof.

In addition, the components of the embodiments described with reference to each drawing are not limited to the corresponding embodiments, and may be implemented to be included in other embodiments within the scope of maintaining the technical spirit of the present invention, and a plurality of embodiments may be re-implemented as a single integrated embodiment even if separate descriptions are omitted.

In addition, when describing with reference to the accompanying drawings, identical or related reference numerals will be assigned to identical components regardless of the reference numerals, and overlapping descriptions thereof will be omitted. In describing the present invention, if it is determined that a detailed description of related known technologies may unnecessarily obscure the gist of the present invention, the detailed description will be omitted.

This embodiment considers the trend of increasing installation locations of MEC servers and increasing users of edge computing services, and provides a method to mediate the optimal MEC connection with the user terminal by comprehensively considering not only the user's access location, but also the overall situation such as the type of service, the number of users using the service from the MEC server, and the available computing resource status within the MEC server and the connection cost to a specific MEC server.

Additionally, when a user uses a specific service while moving, this embodiment provides a method to support movement from an initially connected MEC server to an optimal MEC server at a new location depending on the type of service.

In order to provide the method according to this embodiment, an information system that manages the location of each MEC server, the service status provided by each MEC server, the computing resource status within each MEC, and information on the central cloud is required.

In general, the information system management entity and the mobile communication network management entity are separated, and in this case, a query and response process from the mobile communication network to the relevant information system is necessary to utilize the information managed in the information system.

In addition, there are various types of information systems, each with its own independent standard access method and management system, so an interconnection function is required for unified access from the mobile communication network to the relevant information system.

The information system may include an information system on an Internet infrastructure, considering access through the general Internet, in addition to an information system on a cloud computing infrastructure including edge computing infrastructure.

ALTO (Application Layer Traffic Optimization) server at the application protocol layer and LISP (Locator ID Separation Protocol) mapping server at the network layer are proposed, and these can be defined as the information system in this embodiment.

These information systems are separate systems from the mobile communication network infrastructure, and procedures are required to connect to the optimal MEC server in the mobile communication network through interworking with these systems.

In this embodiment, a method of selecting the optimal MEC server by interworking with the information system on the cloud computing infrastructure or the Internet infrastructure, including the edge computing infrastructure in the 5G mobile communication network, and efficiently reselecting the MEC server when the user terminal moves is provided.

Figure 4:
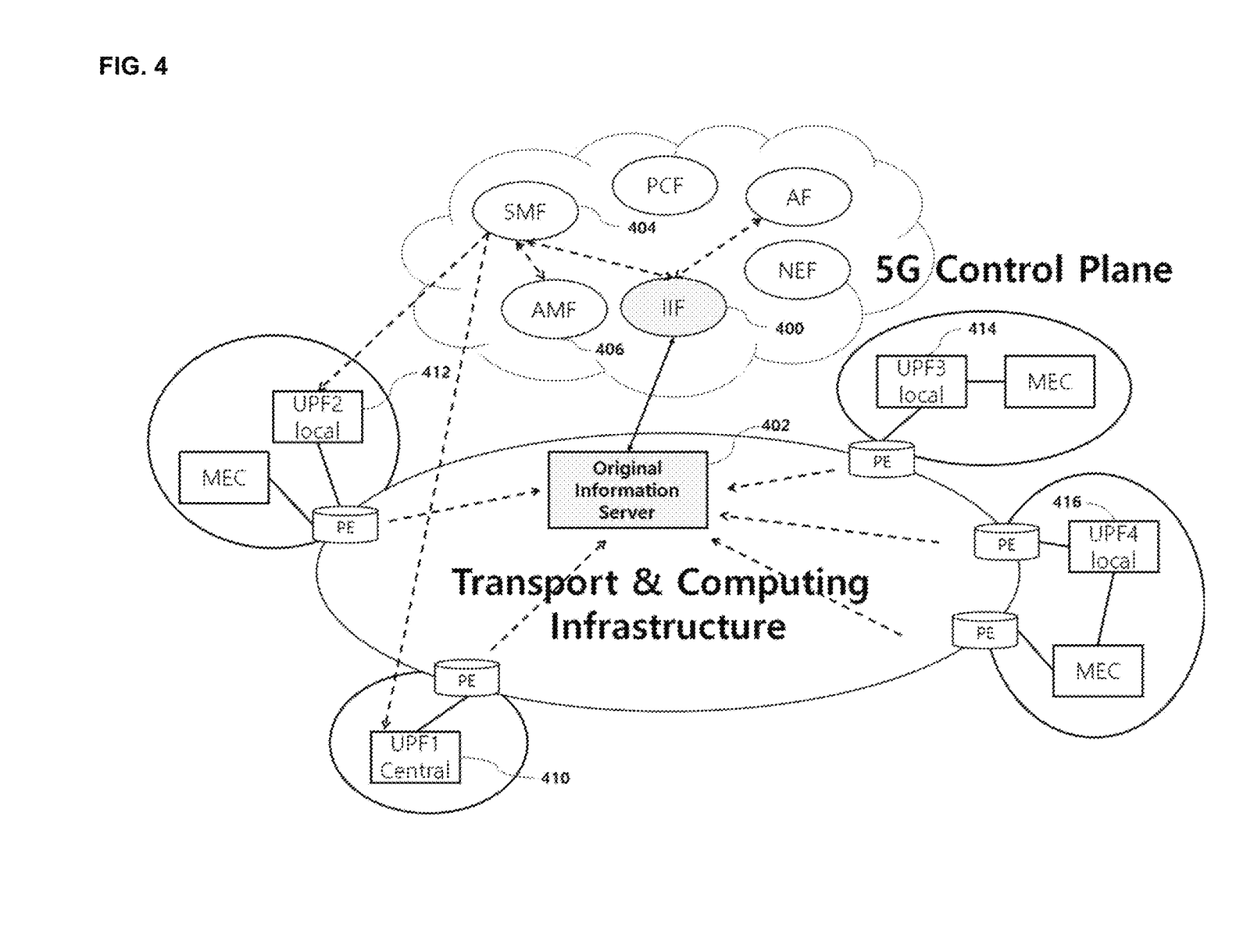
FIG. 4 is a diagram showing a network structure according to a preferred embodiment of the present invention.

FIG. 4 is a diagram showing a network structure according to a preferred embodiment of the present invention.

Referring to FIG. 4, in this embodiment, an infrastructure information function (IIF) 400 is provided within the mobile communication network.

The IIF 400 mediates the connection between the user terminal and the optimal MEC server by interworking with an information system on a cloud computing infrastructure or an information system on an Internet infrastructure that exists separately from the management entity of the mobile communication network when a user requests an edge computing service.

Here, the information system on various infrastructures can be defined as an original infrastructure information server (OIS) 402, it may comprise a computing information server that manages status information of the cloud computing infrastructure, including the MEC server, a LISP mapping server expanded to manage computing instance identifier, location information, and resource status information, and an ALTO server expanded to manage status information of computing infrastructure in addition to Internet networking status information, but it is not necessarily limited to this.

Here, a computing instance is a virtual machine or container computing object that performs a service requested by a user, and is an object within the MEC server or cloud computing infrastructure that performs a service pre-registered by a telecommunication service provider or provides computing resources.

In addition, in this embodiment, the edge computing service may not only include services pre-registered by mobile communication service providers, such as video analysis services, augmented reality services, V2I (Vehicle to Infrastructure) services, autonomous driving services, and smart factory services, but also include general computing services.

Furthermore, the connection between the user terminal and the optimal MEC server can be defined as a connection using the IP address of one or more computing instances provided by each MEC server.

That is, in this disclosure, selection of the optimal MEC server can be defined as not only selecting the MEC server that provides the service requested by the user, but also selecting the final computing object corresponding to the computing instance provided by the MEC server.

In FIG. 4, UPF 1 (410) is a central UPF for general Internet access of user terminals, and UPFs 2 to 4 (412 to 416) are UPFs for access to a certain MEC server.

While MEC 3 can only be accessed through UPF 3, MEC 2 and 4 can also be accessed through a general Internet network through PE (Provider Edge of Internet Infrastructure).

In this embodiment, it is assumed that a user terminal accesses the MEC server through UPF in a mobile communication network, such as MEC 3.

The IIF 400 according to this embodiment receives a user plane function (UPF) selection request message from the session management function (SMF) 404 when the user terminal of the mobile communication network requests an edge computing service.

The user terminal's edge computing service request is a PDU session connection request, and the access and mobility management function (AMF) 406, which is responsible for the mobility management function of the user terminal, selects the SMF 404 to connect the PDU session and transmits the request to the selected SMF 404.

After receiving the UPF selection request message, the IIF 400 selects the optimal MEC server for providing the requested edge computing service through internally stored information or a query and response with the OIS 402 in the cloud computing infrastructure or Internet infrastructure (Transport & Computing Infrastructure) and transmits a response message including a UPF identifier for connection to the selected optimal MEC server to the SMF 404.

At this time, the IIF 400 may select the optimal MEC server while storing information related to one or more available MEC servers that can accommodate the requested edge computing service among all MEC servers.

Information stored internally to select the optimal MEC server may be periodically updated in conjunction with the OIS 402, or may be stored upon request from the user terminal.

Figure 5:
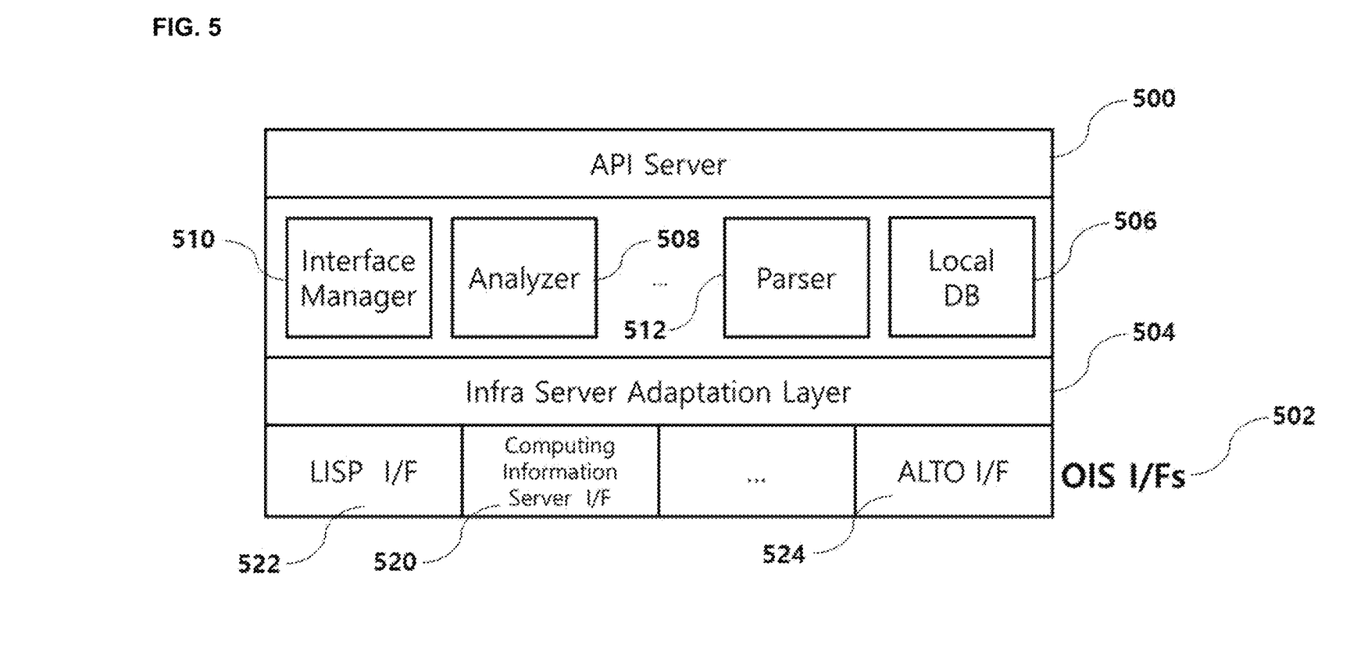
FIG. 5 is a diagram showing the detailed structure of IIF according to this embodiment.

FIG. 5 is a diagram showing the detailed structure of IIF according to this embodiment.

Referring to FIG. 5, the interface (I/F) for external communication with the IIF 400 includes a first interface (API server) 500 that provides information through API to various NFs (Network Functions) in the mobile communication network control plane and a second interface 502 for collecting information from various OISs 402 on a cloud computing infrastructure or Internet infrastructure.

Here, the API server 500 transmits and receives messages with NFs on the external control plane.

When a user terminal requests a service, the IIF 400 can be defined as a virtual function that provides Information obtained in conjunction with the above-mentioned OIS 402 to SMF (Session Management Function), AF (Application Function), and NEF (Network Exposure Function) on the 5G control plane of the 5G mobile communication network, and communicates with NFs through the API server 500. In particular, when there is a request for edge computing service from a user terminal, it receives a UPF selection request message from SMF 404 and transmits a response message thereto.

The second interface 502 follows the protocol of each information system, and accesses according to the protocol of the new infrastructure information system in the form of a plug-in through the infrastructure server adaptation layer 504.

The second interface 502 may comprise a computing information server interface 520 responsible for access to servers on the cloud computing infrastructure, an ALTO Interface 522 responsible for access to an ALTO server, and a LISP interface 524 responsible for access to a LISP mapping server.

The ALTO interface 522 implements ALTO's client function and performs query and response with the ALTO server by the ALTO protocol (RFC 7285 Application-Layer Traffic Optimization (ALTO) Protocol).

According to this embodiment, in order to accommodate the service request of the user terminal, it is assumed that the ALTO server has an expanded environment to provide the computing resource status with the network topology information in addition to the existing function, as in IETF's draft-contreras-alto-service-edge (Use of ALTO for Determining Service Edge).

It is assumed that the ALTO server can manage the information below and respond to queries from the ALTO interface, which is the ALTO client.

1) Type of instance ((T): the types of instances are characterized as B (Basic), or N (Network Intensive))
2) Interface option ((I): it refers to the associated bandwidth of the network interface)
3) Compute flavor ((F): it refers to a given predefined combination of resources in terms of virtual CPU, RAM, disk, and bandwidth for the management interface)
4) Optional storage extension ((S): allows to request additional storage capacity)
5) Optional hardware acceleration characteristics ((A): to request specific acceleration cap)

The response information includes computing instance information of the MEC server, address information (IP address) and authentication information of each computing instance, and based on this, the IIF 400 can respond UPF information for connection to the MEC server that provides the service requested by the user terminal to SMF 404.

It is assumed that the ALTO server is expanded to manage service names operated in an edge computing environment, MEC servers providing each service, and address information, authentication information, and resource status information regarding one or more computing instances provided by each MEC server, and the corresponding information may be stored as the latest information in the IIF 400 periodically or when there is a query from the ALTO interface 522.

The LISP interface 524 performs a query and response process with the LISP mapping server based on the LISP protocol.

It is assumed that the LISP mapping server, like the ALTO server, is expanded to manage information related to services operated in an edge computing environment.

Here, instances for providing general computing resources should be predefined as a limited type according to the size of the computing resource, and should be assigned a unique identifier from LISP's ID Pool.

In this case, like the service identifier, the unique identifier and location information of each individual computing instance are managed in the LISP mapping server.

More specifically, the LISP server manages service or computing instance identifiers, location information, and usage status (currently available service resource status information or number of computing instances).

Information obtained from the OIS 402 within the cloud computing infrastructure or Internet infrastructure is analyzed, processed into a predetermined form, and stored in an internal local database (Local DB, 506).

Figure 6:
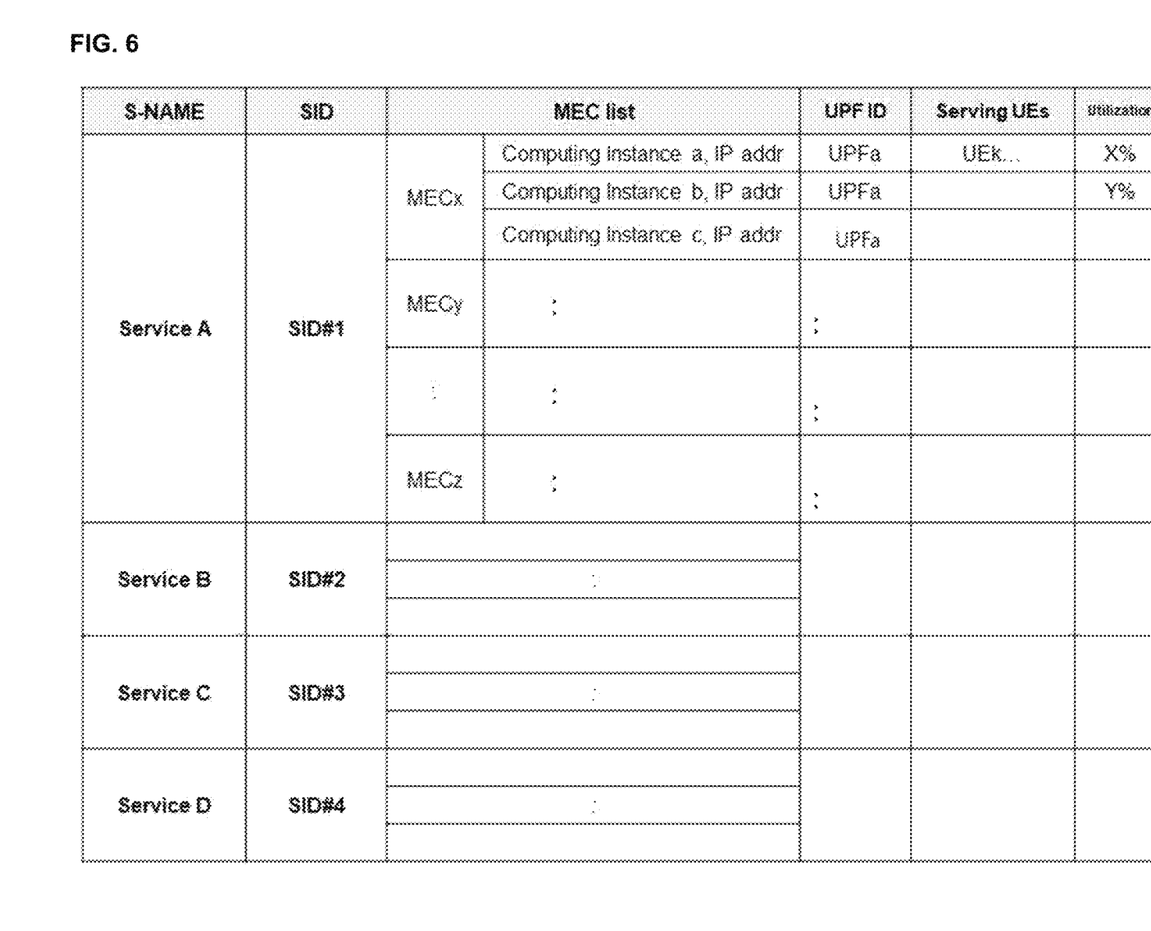
FIG. 6 is a diagram showing information stored in a local database according to this embodiment.

FIG. 6 is a diagram showing information stored in a local database according to this embodiment.

As shown in FIG. 6, the local database 506 stores the name of a service operating in an edge computing environment and a service identifier for identification.

In addition, service identifiers, a list of MEC servers providing each service, UPF identifiers for connection to each MEC server, user terminal information receiving services from each MEC server, and address information of one or more computing instances provided by each MEC server and utilization rate of each computing instance are stored.

Here, the utilization rate is determined by considering the usage of a CPU/GPU, main memory, and storage of one or more computing instances provided by each of the plurality of MEC servers.

At this time, the local database 506 may store not information about all MEC servers, but identifiers for one or more available MEC servers that can accommodate the requested edge computing service and resource status information of the one or more MEC servers.

When a UPF selection request message is received from the SMF 404 through the API server 500, the analyzer 508 uses the information stored in the local database 506 to select the optimal MEC server for providing the edge computing service requested by the user terminal.

The user terminal's edge computing service request may include a user terminal identifier and a service identifier for the edge computing service.

If information related to the identifier of the requested service is stored, the analyzer 508 refers to the local database 506 and selects the optimal MEC server.

On the other hand, if a service corresponding to the requested edge computing service does not exist in the local database 506, by querying the identifier of the requested edge computing service to the OIS 402 in the cloud computing infrastructure or Internet infrastructure through the second interface 502 as a variable, the identifier of one or more MEC servers capable of providing the requested edge computing service and the resource status information of the one or more MEC servers are received and stored, and the optimal MEC server is selected through this.

As described above, the optimal MEC server selection by the analyzer 508 may be computing instance selection to provide edge computing services.

The API server 500 transmits a response message including a computing instance IP address selected to provide an edge computing service and a UPF identifier for accessing the IP address to the SMF 404.

The SMF 404, which receives the response message, connects the user terminal to the selected computing instance.

Meanwhile, according to this embodiment, the local database 506 stores user terminal information that receives services from each MEC server, so when the location of the user terminal connected to the MEC server moves to use a specific service, the analyzer 508 may reselect the optimal MEC server for the user terminal considering the moved location.

According to this embodiment, the response message may further include authentication information (ID/password) for the user terminal to access the selected computing instance.

The Interface Manager 510 performs operations of adding or deleting accesses to the OIS 402 within the cloud computing infrastructure or Internet infrastructure.

The parser 512 interprets the request of the external control plane transmitted to the API server 500.

Below, the edge computing service-providing process according to this embodiment will be described in detail, focusing on service scenarios.

Figure 7:
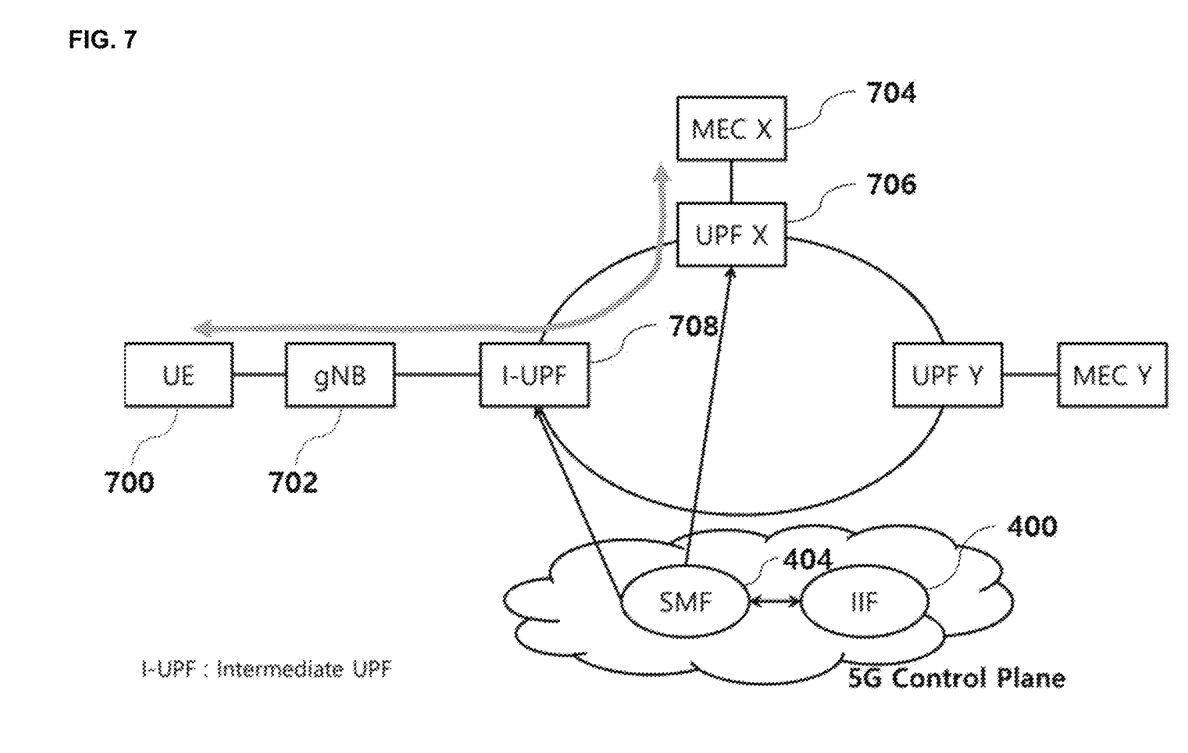
FIG. 7 is a diagram showing a network structure for processing edge computing service requests according to this embodiment.
Figure 8:
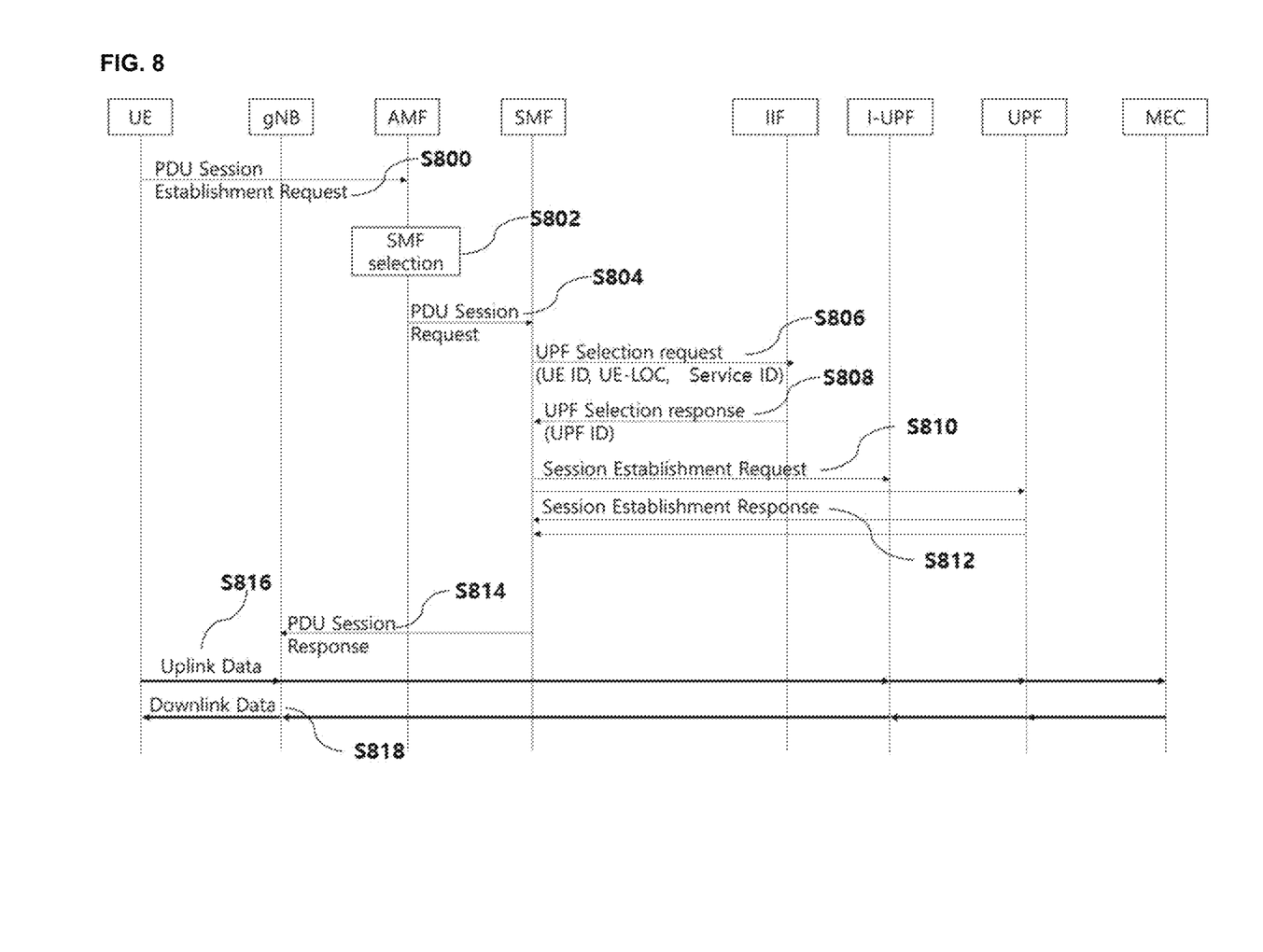
FIG. 8 is a diagram illustrating a procedure for processing an edge computing service request according to this embodiment.

FIG. 7 is a diagram illustrating a network structure for processing edge computing service requests according to this embodiment, and FIG. 8 is a diagram illustrating a procedure for processing edge computing service requests according to this embodiment.

Referring to FIGS. 7 to 8, the user terminal 700 transmits an edge computing service request to the AMF 406 through the gNB 702 (step 800).

Service identifiers are assigned differently depending on the type of service pre-registered by the mobile communication service provider and the type of computing resource providing service.

AMF 406 selects SMF 404 (step 802) and sends a PDU session request to the selected SMF 404 (step 804).

SMF 404 sends a UPF selection request message to IIF 400 (step 806).

The UPF selection request message may include a user terminal identifier (UE ID), user terminal location information (UE-LOC), and a service identifier (Service ID).

IIF 400 selects the optimal MEC server (MEC X, 704) through information stored in the local database 506 or through query and response with OIS 402, and transmits a response message containing a UPF identifier (UPF X, 706) for connection to the selected MEC server to the SMF 404 (step 808).

Thereafter, the SMF 404 requests a session connection with the selected UPF 706 through the Intermediate UPF (I-UPF, 708) and IIF 400 located adjacent to the user terminal 700 (step 810), and receives a response thereto (step 812).

The SMF 404 transmits a PDU session response to the gNB 702 to which the user terminal 700 is connected (step 814), and finally, data is transmitted and received between the user terminal and the MEC server 704 (steps 816 to 818).

Figure 9:
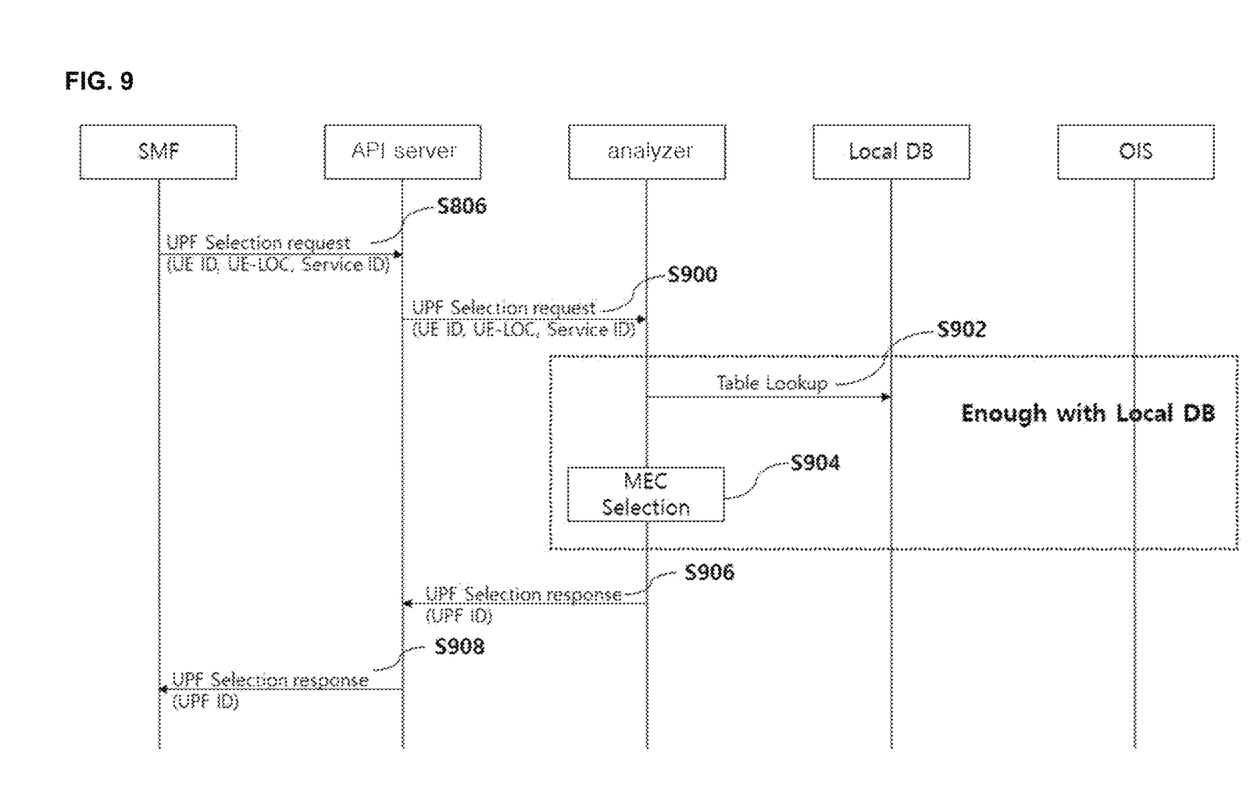
FIG. 9 is a flowchart showing the optimal MEC server selection process in IIF according to this embodiment.

FIG. 9 is a flowchart showing the optimal MEC server selection process in IIF according to this embodiment.

Referring to FIG. 9, as in step 806 of FIG. 8, when the SMF 404 transmits a UPF selection request message, the API server 500 of the IIF 400 transmits the UPF selection request message to the analyzer 508 (step 900).

The analyzer 508 performs table lookup in a local database 506 (step 902) and selects the optimal MEC server to provide the requested edge computing service (step 904).

Afterwards, a response message including a UPF identifier for connection to the optimal MEC server is generated and delivered to the API server 500 (step 906), and the API server 500 transmits the response message to the SMF 404 (step 908).

Figure 10:
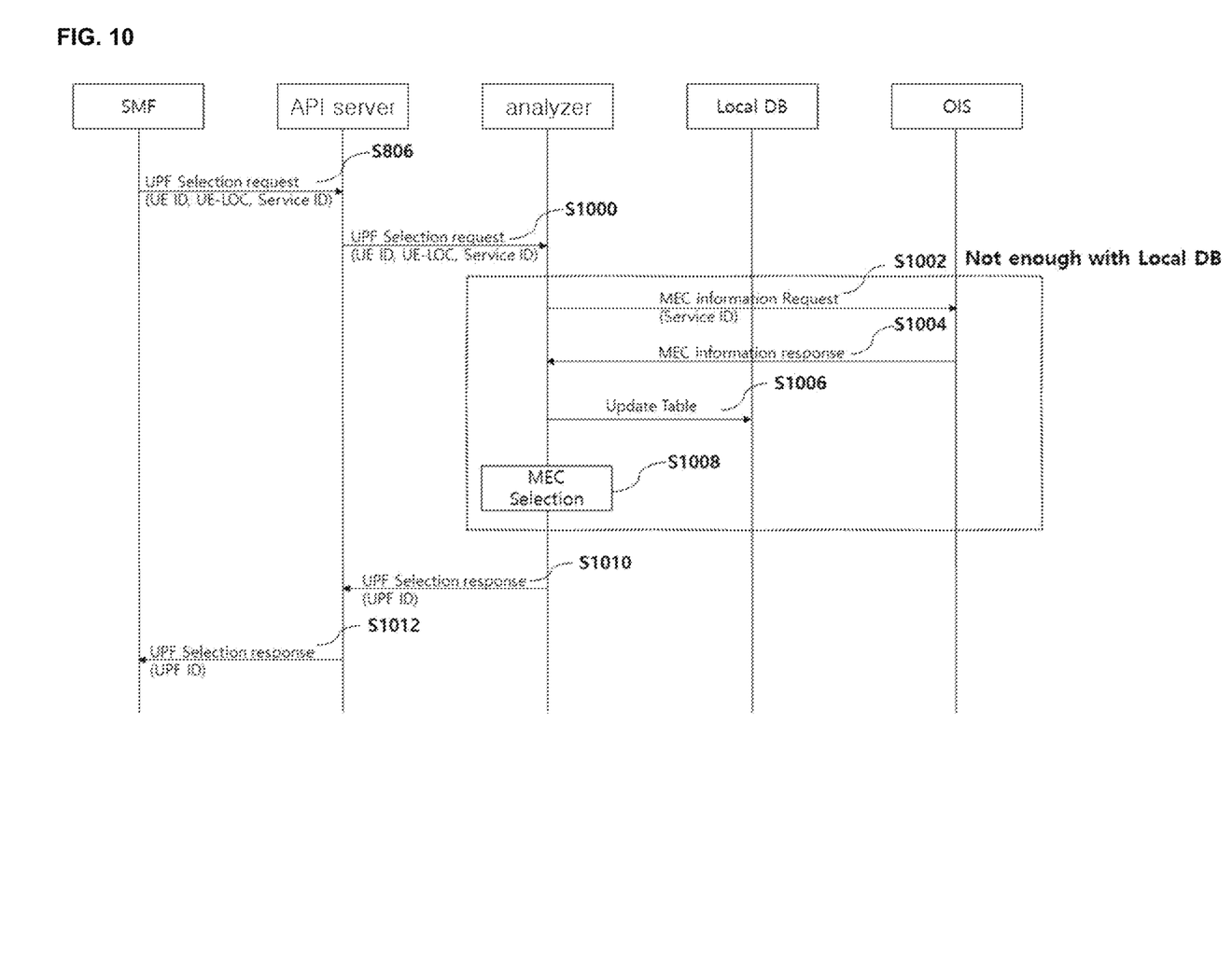
FIG. 10 is a flowchart showing the optimal MEC server selection process in IIF according to another embodiment of the present invention.

FIG. 10 is a flowchart showing the optimal MEC server selection process in IIF according to another embodiment of the present invention.

FIG. 10 is a diagram illustrating a process performed when the IIF does not store information for the service included in the edge computing service request of the user terminal.

Referring to FIG. 10, as in step 806 of FIG. 8, when the SMF 404 transmits a UPF selection request message, the API server 500 of the IIF 400 transmits the UPF selection request message to the analyzer 508 (step 1000).

If there is no service corresponding to the requested edge computing service in the local database 506, the analyzer 508 transmits a query to the OIS 402 using the identifier of the requested edge computing service as a variable (step 1002), and receives a response thereto (step 1004).

Steps 1002 to 1004 may be a process of receiving an identifier for one or more available MEC servers that can accommodate the requested edge computing service, a computing instance identifier provided by each MEC server, its address information, authentication information, the one or more MEC servers and resource status information of each computing instance, etc.

The local database 506 is updated using the above information (step 1006), and the analyzer 508 selects the optimal MEC server using the information received from the OIS 402 (step 1008).

The analyzer 508 generates a response message including a UPF identifier for connection to the optimal MEC server and transmits it to the API server 500 (step 1010), and the API server 500 transmits the response message to the SMF 404 (step 1012).

The infrastructure information apparatus for edge computing services located in the control plane of the mobile communication network according to this embodiment may include a processor and memory.

Here, the memory comprises program instruction executable by the processor comprising receiving a user plane function (UPF) selection request message from a session management function (SMF) of the mobile communication network when there is an edge computing service request from a user equipment (UE), storing at least one of a plurality of service names, a plurality of service identifiers corresponding to the plurality of service names, a plurality of MEC (multi-access edge computing) server identifiers, resource status information for each of the plurality of MEC servers, a UPF identifier for connection to each of the plurality of MEC servers, and a user terminal identifier connected to each of the plurality of MEC servers, selecting an optimal MEC server for providing the requested edge computing service through information stored in the local database or through query and response with an information system in a cloud computing infrastructure or Internet infrastructure, transmitting a response message including a UPF identifier for connection to the selected optimal MEC server to the SMF.

The above-described embodiments of the present invention have been disclosed for illustrative purposes, and those skilled in the art will be able to make various modifications, changes, and additions within the spirit and scope of the present invention, and such modifications, changes, and additions should be regarded as falling within the scope of the patent claims below.

The invention claimed is:

1. An infrastructure information apparatus for an edge computing service located in a control plane of a mobile communication network comprising:
    an API server that receives a user plane function (UPF) selection request message from a session management function (SMF) of the mobile communication network when there is an edge computing service request from a user equipment (UE);
    a local database that stores at least one of a plurality of service names, a plurality of service identifiers corresponding to the plurality of service names, a plurality of MEC (multi-access edge computing) server identifiers, resource status information for each of a plurality of MEC servers, a UPF identifier for connection to each of the plurality of MEC servers, and a user terminal identifier connected to each of the plurality of MEC servers;
    an analyzer that selects an optimal MEC server for providing the requested edge computing service through information stored in the local database or through query and response with an information system in a cloud computing infrastructure or Internet infrastructure; and
    a plurality of interfaces responsible for access to a plurality of information systems, each having an independent standard access method and management system, and being separate from a management entity of the mobile communication network,
    wherein the API server transmits a response message including a UPF identifier for connection to the selected optimal MEC server to the SMF,
    wherein information stored in the local database is periodically updated,
    wherein, when a service corresponding to the requested edge computing service does not exist in the local database, the apparatus queries the information system with a name of the requested edge computing service as a variable to receive one or more MEC server identifiers capable of providing the requested edge computing service, a computing instance identifier within each MEC server, an IP address and authentication information for accessing each computing instance, and resource status information of the one or more MEC servers and each computing instance.

2. The apparatus of claim 1, wherein the edge computing service request includes the user terminal identifier and a service identifier for the edge computing service.

3. The apparatus of claim 2, wherein the service identifier is assigned differently depending on a type of service pre-registered by a mobile communication service provider and a type of computing resource providing service.

4. The apparatus of claim 3, wherein the pre-registered service includes at least one of a video analysis service, an augmented reality service, a V2I (Vehicle to Infrastructure) service, an autonomous driving service, and a smart factory service.

5. The apparatus of claim 1, wherein the local database stores an identifier for one or more available MEC servers that can accommodate the requested edge computing service among all MEC servers and resource status information of the one or more MEC servers.

6. The apparatus of claim 1, wherein the local database stores one or more computing instance identifiers provided by each of the plurality of MEC servers and an IP address of each computing instance.

7. The apparatus of claim 6, wherein the response message includes a computing instance IP address selected to provide the requested edge computing service and a UPF identifier for accessing the IP address.

8. The apparatus of claim 6, wherein the response message further includes authentication information for the user terminal to access the selected computing instance.

9. The apparatus of claim 6, wherein the resource status information is defined as a utilization rate considering the usage of a CPU/GPU, main memory, and storage of each of one or more computing instances provided by each of the plurality of MEC servers.

10. The apparatus of claim 1, wherein, when a location of a first user terminal moves by referring to information stored in the local database, the analyzer reselects an optimal MEC server for the first user terminal considering the moved location of the first user terminal.

11. The apparatus of claim 1, wherein the information system comprises a computing information server, ALTO (Application Layer Traffic Optimization) server, and LISP (Location ID Separation Protocol) mapping server included in the information system.

12. An infrastructure information apparatus for an edge computing service located in a control plane of a mobile communication network comprising:

a processor; and a memory connected to the processor, wherein the memory comprises program instructions executable by the processor comprising:

receiving a user plane function (UPF) selection request message from a session management function (SMF) of the mobile communication network when there is an edge computing service request from a user equipment (UE);

storing at least one of a plurality of service names, a plurality of service identifiers corresponding to the plurality of service names, a plurality of MEC (multi-access edge computing) server identifiers, resource status information for each of a plurality of MEC servers, a UPF identifier for connection to each of the plurality of MEC servers, and a user terminal identifier connected to each of the plurality of MEC servers;

selecting an optimal MEC server for providing the requested edge computing service through information stored in the local database or through query and response with an information system in a cloud computing infrastructure or Internet infrastructure; and transmitting a response message including a UPF identifier for connection to the selected optimal MEC server to the SMF, wherein the infrastructure information apparatus:
accesses to a plurality of information systems, each having an independent standard access method and management system, and being separate from a management entity of the mobile communication network through a plurality of interfaces; and periodically updates information stored in the local database, wherein, when a service corresponding to the requested edge computing service does not exist in the local database, queries the information system with a name of the requested edge computing service as a variable to receive one or more MEC server identifiers capable of providing the requested edge computing service, a computing instance identifier within each MEC server, an IP address and authentication information for accessing each computing instance, and resource status information of the one or more MEC servers and each computing instance.

13. A method for providing an edge computing service from an apparatus located in a control plane of a mobile communication network comprising:

receiving a user plane function (UPF) selection request message from a session management function (SMF) of the mobile communication network when there is an edge computing service request from a user equipment (UE);

storing at least one of a plurality of service names, a plurality of service identifiers corresponding to the plurality of service names, a plurality of MEC (multi-access edge computing) server identifiers, resource status information for each of a plurality of MEC servers, a UPF identifier for connection to each of the plurality of MEC servers, and a user terminal identifier connected to each of the plurality of MEC servers;

selecting an optimal MEC server for providing the requested edge computing service through information stored in the local database or through query and response with an information system in a cloud computing infrastructure or Internet infrastructure; and transmitting a response message including a UPF identifier for connection to the selected optimal MEC server to the SMF, wherein selecting an optimal MEC server comprises:
accessing to a plurality of information systems, each having an independent standard access method and management system, and being separate from a management entity of the mobile communication network through a plurality of interfaces and periodically updating information stored in the local database, wherein, when a service corresponding to the requested edge computing service does not exist in the local database, querying the information system with a name of the requested edge computing service as a variable to receive one or more MEC server identifiers capable of providing the requested edge computing service, a computing instance identifier within each MEC server, an IP address and authentication information for accessing each computing instance, and resource status information of the one or more MEC servers and each computing instance.

* * * * *